(12) United States Patent
Durkovic

(10) Patent No.: US 12,227,249 B2
(45) Date of Patent: Feb. 18, 2025

(54) WHEEL SUPPORT OF A VEHICLE, COMPRISING A RECEIVING AREA FOR A TRACK ROD

(71) Applicant: Bayerische Motoren Werke Aktiengesellschaft, Munich (DE)

(72) Inventor: Martin Durkovic, Zvolen (SK)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 123 days.

(21) Appl. No.: 16/766,997

(22) PCT Filed: Sep. 20, 2018

(86) PCT No.: PCT/EP2018/075454
§ 371 (c)(1),
(2) Date: May 26, 2020

(87) PCT Pub. No.: WO2019/115035
PCT Pub. Date: Jun. 20, 2019

(65) Prior Publication Data
US 2020/0369317 A1    Nov. 26, 2020

(30) Foreign Application Priority Data
Dec. 14, 2017  (DE) .................... 10 2017 222 757.5

(51) Int. Cl.
*B62D 7/16*  (2006.01)
*B62D 7/18*  (2006.01)
(Continued)

(52) U.S. Cl.
CPC ................. *B62D 7/16* (2013.01); *B62D 7/18* (2013.01); *B62D 7/228* (2013.01); *B62D 17/00* (2013.01);
(Continued)

(58) Field of Classification Search
CPC .......... B60G 2204/41; B60G 2204/416; F16C 11/0695; F16F 1/387; F16F 1/3873;
(Continued)

(56) References Cited

U.S. PATENT DOCUMENTS 2,324,984 A * 7/1943 Brown ................ F16C 11/0671
403/139
2,414,743 A * 1/1947 Kaemmerling ........... F16D 3/76
29/436
(Continued)

FOREIGN PATENT DOCUMENTS

CN        200989372 Y     12/2007
CN        103121387 A      5/2013
(Continued)

OTHER PUBLICATIONS

International Search Report (PCT/ISA/210) issued in PCT Application No. PCT/EP2018/075454 dated Jan. 28, 2019 with English translation (seven pages).

(Continued)

*Primary Examiner* — Timothy Wilhelm
(74) *Attorney, Agent, or Firm* — Crowell & Moring LLP

(57) ABSTRACT

A wheel support or a pivot bearing of a vehicle includes a receiving molding for a ball-joint pin of a track rod for changing the toe angle of a wheel rotatably secured to the wheel support or pivot bearing. The receiving molding is provided with an elastomer layer which lies at least partly in a force transmission path from the ball-joint pin to the wheel support or pivot bearing. The elasticity or possible elastic deformability of the elastomer layer is lower in the receiving molding sections via which a greater force component is transmitted, in particular in the range of smaller track angles, when the track rod is moved in order to steer the wheel than in receiving molding sections via which a smaller force (Continued)

component or no force component is transmitted when the track rod is moved in order to steer the wheel.

14 Claims, 1 Drawing Sheet

(51) Int. Cl.
  *B62D 7/22* (2006.01)
  *B62D 17/00* (2006.01)
  *F16C 11/06* (2006.01)
(52) U.S. Cl.
  CPC .... *B60G 2204/148* (2013.01); *B60G 2204/41* (2013.01); *B60G 2204/416* (2013.01); *B60G 2500/40* (2013.01); *F16C 11/0695* (2013.01); *F16C 2326/24* (2013.01)
(58) Field of Classification Search
  CPC ........... F16F 1/3876; B62D 7/16; B62D 7/18; B62D 7/228; B62D 17/00
  See application file for complete search history.

(56) References Cited

U.S. PATENT DOCUMENTS

| | | | | |
|---|---|---|---|---|
| 2,771,300 A * | 11/1956 | Latzen | F16C 11/0619 | 403/56 |
| 2,797,929 A * | 7/1957 | Herbenar | F16C 11/04 | 280/93.508 |
| 2,827,303 A * | 3/1958 | Herbenar | F16F 1/38 | 403/228 |
| 2,952,486 A * | 9/1960 | Franz | F16C 11/08 | 403/162 |
| 3,053,556 A * | 9/1962 | Klocke | B62D 7/16 | 403/138 |
| 3,089,717 A * | 5/1963 | Gair | F16C 11/0604 | 29/505 |
| 3,112,123 A * | 11/1963 | True | F16C 11/08 | 280/93.509 |
| 3,130,991 A * | 4/1964 | Piragino | F16C 11/045 | 403/224 |
| 3,135,540 A * | 6/1964 | Herbenar | F16C 11/04 | 403/124 |
| 3,290,073 A * | 12/1966 | Gottschald | F16C 11/0671 | 277/504 |
| 3,347,576 A * | 10/1967 | Templeton | F16C 11/0604 | 403/133 |
| 3,408,124 A * | 10/1968 | Melton | B60G 7/005 | 403/288 |
| 3,520,554 A * | 7/1970 | Ravenel | B60G 7/005 | 301/108.3 |
| 3,526,413 A * | 9/1970 | Alf | B62D 17/00 | 280/86.756 |
| 3,801,209 A * | 4/1974 | Matsuoka | B60G 7/02 | 384/296 |
| 4,109,979 A * | 8/1978 | Estaque | B60G 7/02 | 267/269 |
| 4,234,236 A * | 11/1980 | Inbody | F16D 65/123 | 244/50 |
| 4,334,795 A * | 6/1982 | Westphal | B62D 7/18 | 403/140 |
| 4,424,984 A * | 1/1984 | Shiratori | B60G 7/02 | 280/86.753 |
| 4,531,761 A * | 7/1985 | von Sivers | B60G 99/004 | 267/293 |
| 4,723,791 A * | 2/1988 | Miura | B60G 7/02 | 267/257 |
| 4,934,729 A * | 6/1990 | Murata | B62D 7/22 | 280/124.136 |
| 5,058,867 A * | 10/1991 | Hadano | F16C 11/0614 | 280/124.1 |
| 5,318,373 A * | 6/1994 | Buhl | B60G 7/005 | 403/228 |
| 5,333,896 A * | 8/1994 | Creighton | F16C 35/06 | 180/905 |
| 5,380,024 A * | 1/1995 | Hayami | B60G 3/20 | 280/124.138 |
| 5,380,036 A * | 1/1995 | Perkins | B60G 7/04 | 280/124.165 |
| 5,498,018 A * | 3/1996 | Wahl | B60G 3/26 | 280/124.138 |
| 5,531,534 A * | 7/1996 | Urbach | F16C 11/0671 | 277/635 |
| 5,577,854 A * | 11/1996 | Jacob | F16F 7/02 | 280/93.508 |
| 5,597,258 A * | 1/1997 | Kincaid | F16F 1/38 | 403/138 |
| 5,620,261 A * | 4/1997 | Salz | F16F 1/3863 | 384/276 |
| 5,803,200 A * | 9/1998 | Brandt | B60G 9/00 | 280/124.1 |
| 5,845,926 A * | 12/1998 | Davis | B60G 3/26 | 280/124.136 |
| 5,961,219 A * | 10/1999 | Maughan | F16F 1/38 | 384/220 |
| 6,076,840 A * | 6/2000 | Kincaid | B60G 21/0551 | 267/188 |
| 6,164,405 A * | 12/2000 | Sakata | F16F 1/387 | 248/638 |
| 6,167,361 A * | 12/2000 | Bristow | B60G 9/00 | 703/1 |
| 6,170,812 B1 * | 1/2001 | Nicoles | F16F 1/38 | 267/281 |
| 6,446,993 B1 * | 9/2002 | Huszarik | B60G 7/02 | 280/124.1 |
| 6,631,914 B2 * | 10/2003 | Kawamura | B60G 3/24 | 280/124.177 |
| 6,666,438 B2 * | 12/2003 | Nakagawa | F16F 1/3814 | 267/141.2 |
| 6,698,775 B2 * | 3/2004 | Ness | B60G 7/02 | 403/3 |
| 6,767,020 B2 * | 7/2004 | Yamamoto | A61P 15/00 | 280/124.109 |
| 6,854,917 B2 * | 2/2005 | Kraine, Jr. | F16C 11/08 | 403/120 |
| 7,077,407 B2 * | 7/2006 | Shin | B60G 21/05 | 280/124.137 |
| 7,111,855 B2 * | 9/2006 | Winkler | B62D 17/00 | 280/86.754 |
| 7,234,693 B2 * | 6/2007 | Schnaars | F16F 1/3863 | 267/293 |
| 7,364,176 B2 * | 4/2008 | Saitoh | F16F 1/3873 | 280/124.13 |
| 7,475,894 B2 * | 1/2009 | Hodge | B60G 21/05 | 280/124.156 |
| 7,581,740 B1 * | 9/2009 | Stimely | B60G 17/021 | 280/124.136 |
| 8,100,423 B2 * | 1/2012 | Kruse | B60G 7/001 | 280/124.134 |
| 8,235,622 B2 * | 8/2012 | Brunneke | F16C 11/0633 | 403/135 |
| 8,480,106 B1 * | 7/2013 | Cohen | B60G 17/005 | 280/5.502 |
| 8,490,983 B2 * | 7/2013 | Schmid | B60G 7/008 | 280/5.521 |
| 8,517,404 B2 * | 8/2013 | Yamada | B60G 7/02 | 267/257 |
| 8,579,308 B2 * | 11/2013 | Weeks | B60G 3/20 | 280/124.109 |
| 8,733,768 B1 * | 5/2014 | Shoulders | B60G 7/02 | 280/86.757 |
| 8,783,993 B2 * | 7/2014 | Brunneke | F16F 1/3842 | 280/93.511 |
| 8,814,185 B2 * | 8/2014 | Luttinen | B60G 7/005 | 280/86.758 |
| 8,851,209 B2 * | 10/2014 | Fukumoto | B62D 55/10 | 180/9.26 |
| 8,851,484 B2 * | 10/2014 | Dantzie | B60G 7/008 | 280/124.121 |

(56) References Cited

U.S. PATENT DOCUMENTS

| | | | | |
|---|---|---|---|---|
| 9,010,716 | B2* | 4/2015 | Kobori | F16F 1/3735 |
| | | | | 248/635 |
| 9,016,971 | B2* | 4/2015 | Masi | F16F 1/3842 |
| | | | | 403/228 |
| 9,162,705 | B2* | 10/2015 | Aldrich | B62D 7/20 |
| 9,180,735 | B2* | 11/2015 | Tipton | B62D 21/14 |
| 9,393,852 | B2* | 7/2016 | Kobayashi | B60G 21/0551 |
| 9,611,916 | B2* | 4/2017 | Shimada | B60K 5/1241 |
| 9,709,116 | B2* | 7/2017 | Shimada | F16F 1/38 |
| 9,714,680 | B2* | 7/2017 | Cha | F16F 1/3842 |
| 9,751,370 | B2* | 9/2017 | Weifenbach | B62D 17/00 |
| 9,925,838 | B2* | 3/2018 | Karpman | B60G 7/005 |
| 9,976,619 | B2* | 5/2018 | Yahata | F16F 1/3842 |
| 9,995,358 | B2* | 6/2018 | Powell | F16F 1/3835 |
| 10,428,891 | B2* | 10/2019 | Koba | F16F 1/3842 |
| 10,508,701 | B2* | 12/2019 | Cerri, III | B60G 7/008 |
| 10,633,021 | B2* | 4/2020 | Gordon | B60G 15/063 |
| 10,981,425 | B1* | 4/2021 | Compton | B60G 7/008 |
| 11,209,066 | B2* | 12/2021 | Durand | F16F 1/3814 |
| 2005/0191120 | A1* | 9/2005 | Oellers | F16C 11/0652 |
| | | | | 403/133 |
| 2006/0017256 | A1* | 1/2006 | Hupperich, Jr. | B60G 9/00 |
| | | | | 280/124.156 |
| 2008/0240847 | A1* | 10/2008 | Crouse | B62D 17/00 |
| | | | | 403/122 |
| 2017/0146087 | A1* | 5/2017 | Koba | F16F 1/38 |
| 2019/0256137 | A1* | 8/2019 | Durand | F16F 1/38 |
| 2020/0086703 | A1* | 3/2020 | Johnson | B62D 53/125 |
| 2020/0385032 | A1* | 12/2020 | Kounoike | F16F 1/41 |
| 2021/0114426 | A1* | 4/2021 | Kim | F16C 11/0685 |

FOREIGN PATENT DOCUMENTS

| | | |
|---|---|---|
| CN | 206904059 U | 1/2018 |
| DE | 925 802 C | 9/1955 |
| DE | 10 2005 007 613 A1 | 9/2005 |
| DE | 10 2010 023 232 A1 | 8/2011 |
| DE | 10 2012 019 228 A1 | 4/2014 |
| FR | 3048670 A1 * | 9/2017 |

OTHER PUBLICATIONS

German-language Written Opinion (PCT/ISA/237) issued in PCT Application No. PCT/EP2018/075454 dated Jan. 28, 2019 (five pages).

German-language Search Report issued in German Application No. 10 2017 222 757.5 dated Sep. 14, 2020 with partial English translation (12 pages).

Chinese-language Office Action issued in Chinese Application No. 201880076527.9 dated Nov. 16, 2021 with English translation (12 pages).

* cited by examiner

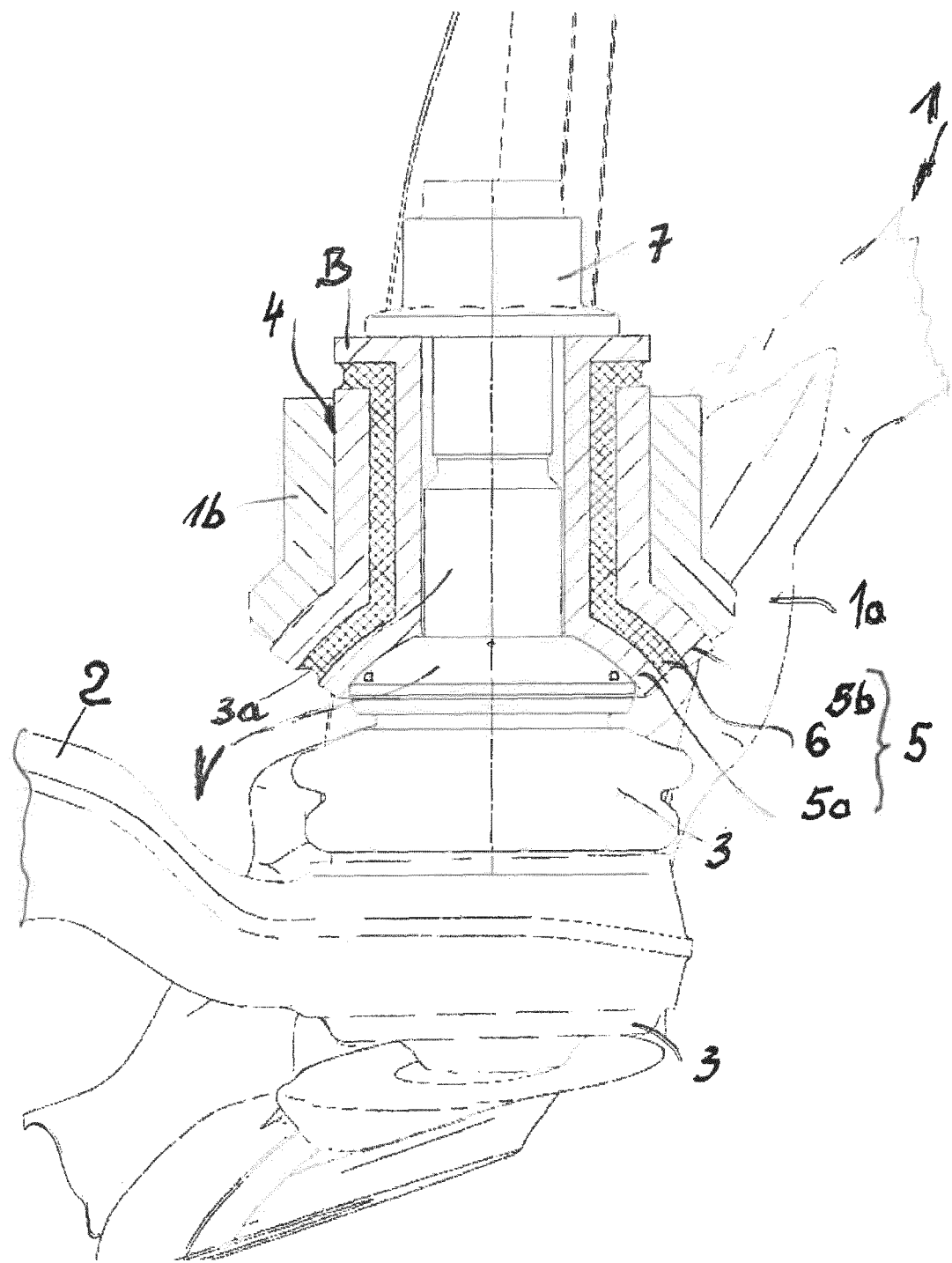

WHEEL SUPPORT OF A VEHICLE, COMPRISING A RECEIVING AREA FOR A TRACK ROD

BACKGROUND AND SUMMARY OF THE INVENTION

The invention relates to a wheel support or a pivot bearing of a vehicle, which has a receiving molding for a ball-joint pin of a track rod for changing the toe angle of a wheel rotatably secured to the wheel support or pivot bearing, i.e. so that the wheel is steerable. In relation to the prior art, in addition to DE 10 2010 023 232 A1, reference is made by way of example to DE 10 2005 007 613 A1 and to DE 10 2012 019 228 A1.

It is known that, in moving vehicles, vibration excitations from the roadway can be transmitted via the wheel suspension into the vehicle structure, which can cause annoying noise there for vehicle occupants. It is also known to represent an impedance jump by damping elastomer bearings or bearings with elastomer elements in the wheel suspension, which, although they do not completely prevent such an annoying vibration transmission, can reduce or damp the same considerably. In the usual prior art, however, such elastomer bearings or rubber bearings are provided only on wheel-guiding links; usually no such damping is carried out on ball joints which, for example, act as a connecting joint between a track rod with which the associated vehicle wheel is steered and the wheel support or pivot bearing supporting the wheel, i.e. the track rod ultimately transfers annoying vibration excitations from the roadway into the vehicle structure virtually unimpeded.

To remedy the problems outlined above, damping devices between the steering mechanism and the track rod head have already been proposed (cf. DE 10 2012 019 228 A1), or an intrinsically damped ball joint is used (DE 10 2005 007 613 A1). However, both are relatively complicated.

It is therefore an object of the present invention to provide a simple solution for producing an impedance jump between a wheel support or pivot bearing of a vehicle wheel and a track rod cooperating therewith.

This object is achieved by a wheel support or a pivot bearing which has a receiving molding for a ball-joint pin of a track rod provided to change a toe angle of a wheel rotatably secured to the wheel support or pivot bearing, wherein an elastomer layer is provided on the receiving molding, which lies at least partly in a force transmission path from the ball joint pin to the wheel support or pivot bearing. Advantageous embodiments and developments are the subject of the sub-claims.

According to the invention, in that region of the wheel support or pivot bearing—for this, only the term "wheel support" will be used below, which incidentally also comprises what is known as the "stub axle"—in or on which the track rod is secured by means of the pin of a ball joint, an elastomer layer is provided in such a way that the latter transmits at least some of the forces between the wheel support and the ball joint pin. The aforementioned region of the wheel support is usually formed in the shape of what is known as a steering arm and is provided with a continuous receiving bore or a similar aperture, into which the joint pin of the ball joint, which is rigidly connected to the track rod by its other end, is inserted. This receiving bore can be the receiving molding which is recited in the claims; however, said receiving molding can also be formed by the aforementioned steering arm, which forms a substantially rigid constituent part of the wheel support or is substantially rigidly connected to the latter. In every case—depending on the individual configuration—it can be relatively simple to attach or provide an elastomer layer, which produces the desired impedance jump.

In order to represent an exact steering feel for the driver of the vehicle and to achieve a quick and exact response of the vehicle to a steering predefinition from the driver, the force transmission path between the track rod and the wheel support should be relatively rigid. In this sense—within the context of an advantageous development of the invention—it may be advantageous if, in those sections of the receiving molding via which a higher proportion of force is transmitted as the track rod is displaced in order to steer the wheel, the elasticity or possible elastic deformability of the elastomer layer according to the invention is lower than in those sections of the receiving molding via which a lower or no proportion of force is transmitted as the track rod is displaced in order to steer the wheel. If, during steering of the wheel, because of the change in the wheel track angle, the sections transmitting a higher or a lower proportion of force change as the wheel track angle changes, then the lower elasticity will preferably be provided in those sections of the receiving molding which, for the transmission of steering force at lower track angles (for example of the order of magnitude of up to 10°), transmit a higher proportion of force. In this range of smaller track angles, this is because the requirement on the exactness and response behavior of the steering is higher than at high track angles close to the maximum steering lock.

If, for example, the elastomer layer encloses the ball-joint pin in the form of an approximately vertical hollow cylinder, by said elastomer layer being applied to the wall of the receiving bore for said pin, then the thickness of the elastomer layer can vary accordingly over the cylinder circumference. For this purpose, the elastomer layer can, for example, be vulcanized on the inner wall of the aforementioned receiving bore (in the wheel support or in the steering arm thereof). The latter is otherwise an advantageous development for the simple illustration of a wheel support according to the invention, according to which the elastomer layer is vulcanized onto or on the receiving molding (in general form and not onto the receiving bore just mentioned), i.e. is applied firmly to the so-called receiving molding within the context of vulcanization.

According to a further possible embodiment, which is also illustrated figuratively as an exemplary embodiment, an at least approximately hollow-cylindrical bush element is provided in the receiving molding, which has the elastomer layer according to the invention, at least in some sections, between an inner bush provided to receive the ball-joint pin and an outer bush resting on the receiving molding. This is shown by the appended single FIGURE.

BRIEF DESCRIPTION OF THE DRAWINGS

FIG. 1 is a schematic sectional plane view of a wheel support in a vertical and in a vehicle transverse direction in a neutral position of the steering.

DETAILED DESCRIPTION OF THE DRAWINGS

In the FIGURE, it is possible to see a few sections of a wheel support 1 and an end section of a track rod 2, on or in which a conventional ball joint 3 is fixed, having a ball-joint pin 3a. The ball-joint pin 3a is plugged into a receiving molding 4 of the wheel support 1, which is provided in the form of a continuous receiving bore in a steering arm section 1a of the wheel support, likewise visible only fragmentarily. However, the ball-joint pin 3a does not rest directly on the wall of the receiving molding 4; instead a substantially hollow-cylindrical bush element 5 is inserted into the latter, which comprises an inner bush 5a and an outer bush 5b, between which an elastomer layer 6 is provided. (The latter is a constituent part of the bush element 5 despite the independent reference number, i.e. despite a reference number not equal to 5). The outer bush 5b is shaped to match the receiving molding 4, while the inner bush 5a receives the ball joint pin 3a. In particular, as can be seen, the matching to the receiving molding 4 and to the ball-joint pin 3a comprises a shield-like shape in the region of the bush element 5 that is at the bottom here, while the inner bush 5a has a collar B which is directed outward in the upper end region and which extends virtually as far as the outer diameter of the outer bush 5b. As can be seen, supported on this collar B of the inner bush 5a is that nut 7 which is screwed onto the free end section of the ball joint pin 3a and which clamps or braces the ball-joint pin 3a in cooperation with its lower likewise shield-like thickening V, matched to which the already mentioned shield-like shape of the lower end section of the bush element 5 is provided, in the receiving molding 4 and in the steering arm section 1a of the wheel support 1. In particular also underneath the collar B (in the drawing and in the installed state on the vehicle), the elastomer layer 6 according to the invention is provided between the inner bush 5a and the outer bush 5b, which is particularly efficient with regard to a desired impedance jump for a transmission of vibrations, in particular in this axial clamping region with respect to the cylindrical axis of the bush element 5.

It is not possible to see from the FIGURE that the thickness and/or elasticity of the elastomer layer 6 can be different, as viewed over the circumference of the bush element 5, but this has already been explained before the FIGURE description. Accordingly, in the illustration of the FIGURE, during a steering movement and thus during a lateral displacement of the track rod 2, in particular a higher proportion of force is transmitted in the transverse direction (in the drawing plane) than in the vehicle longitudinal direction, which is at right angles to the drawing plane. Therefore, the elastomer layer 6 can, for example, be thicker in a front and rear region with respect to the drawing plane than in the section plane illustrated.

What is claimed is:

1. A wheel support or a pivot bearing of a vehicle, comprising:
    a receiving molding for a ball-joint pin of a track rod provided to change a toe angle of a wheel rotatably secured to the wheel support or pivot bearing and configured to receive a cylindrical shaft portion of the ball-joint pin, wherein the cylindrical shaft portion is located above a lower flared portion of the ball-joint pin, wherein the lower flared portion of the ball-joint pin has a larger diameter than the cylindrical shaft portion of the ball-joint pin; and
    an elastomer layer provided at least partially within the receiving molding, wherein the elastomer layer is located at least partly in a force transmission path from the ball-joint pin to the wheel support or pivot bearing and encircles at least the cylindrical shaft portion of the ball-joint pin, wherein
    the elastomer layer includes a flared portion at a bottom portion of the elastomer layer with a profile that matches a profile of the lower flared portion of the ball-joint pin,
    the elastomer layer includes an elastomeric material that is thicker in a front and rear region with respect to the vehicle than in a left and right region with respect the vehicle such that a displaceability of the ball-joint pin relative to the receiving molding is greater in the longitudinal direction than the transverse direction,
    a hollow-cylindrical bush element is provided in the receiving molding, which has the elastomer layer, at least in some sections, between an inner bush provided to receive the ball-joint pin and an outer bush resting on the receiving molding, wherein the outer bush has a lower flared portion and an upper cylinder portion, and wherein the upper cylinder portion is surrounded by the receiving molding along at least a majority of a length of the upper cylinder portion,
    the inner bush comprises a collar at an upper end region that extends outward from the ball-joint pin, and
    the collar of the inner bush contacts a top nut that is screwed into a top end of the cylindrical shaft portion of the ball-joint pin.

2. The wheel support or pivot bearing according to claim 1, wherein
    an elasticity or possible elastic deformability of the elastomer layer is lower in sections of the receiving molding via which a higher proportion of force is transmitted as the track rod is displaced in order to steer the wheel than in sections of the receiving molding via which a lower or no proportion of force is transmitted as the track rod is displaced in order to steer the wheel.

3. The wheel support or pivot bearing according to claim 2, wherein
    the sections with the higher proportion are those in a range of smaller track angles.

4. The wheel support or pivot bearing according to claim 2, wherein
    the elastomer layer is vulcanized onto the receiving molding.

5. The wheel support or pivot bearing according to claim 1, wherein
    the elastomer layer is vulcanized onto the receiving molding.

6. The wheel support or pivot bearing according to claim 1,
    wherein the elastomer layer is configured to be clamped to the lower flared portion of the ball-joint pin by a top nut that is screwed into a top end of the cylindrical shaft portion of the ball-joint pin and which urges the elastomer layer downward.

7. The wheel support or pivot bearing according to claim 1,
    wherein the elastomer layer comprises a collar at an upper end region and which is configured to interface with top nut that is screwed into a top end of the cylindrical shaft portion of the ball-joint pin.

8. The wheel support or pivot bearing according to claim 1,
    wherein the collar of the inner bush extends outward from the ball-join pin perpendicularly to an axis of the ball-joint pin.

9. The wheel support or pivot bearing according to claim 1,
    wherein the collar of the inner bush extends outward from the ball-join pin at least as far as an outer surface of the outer bush that faces away from the ball-joint pin.

10. The wheel support or pivot bearing according to claim 1,
wherein the elastomer layer comprises a collar at an upper end region that extends outward from the ball-joint pin with a profile that matches a profile of the collar of the inner bush, and which is located at least partially between the collar of the inner bush and an upper end of the outer bush.

11. A wheel support or a pivot bearing of a vehicle, comprising:
a receiving molding for a ball-joint pin of a track rod provided to change a toe angle of a wheel rotatably secured to the wheel support or pivot bearing and configured to receive a cylindrical shaft portion of the ball-joint pin, wherein the cylindrical shaft portion is located above a lower flared portion of the ball-joint pin, wherein the lower flared portion of the ball-joint pin has a larger diameter than the cylindrical shaft portion of the ball-joint pin; and
an elastomer layer provided at least partially within the receiving molding, wherein the elastomer layer is located at least partly in a force transmission path from the ball-joint pin to the wheel support or pivot bearing and encircles at least the cylindrical shaft portion of the ball-joint pin, wherein
the elastomer layer includes a flared portion at a bottom portion of the elastomer layer with a profile that matches a profile of the lower flared portion of the ball-joint pin,
a hollow-cylindrical bush element is provided in the receiving molding, which has the elastomer layer, at least in some sections, between an inner bush provided to receive the ball-joint pin and an outer bush resting on the receiving molding, wherein the outer bush has a lower flared portion and an upper cylinder portion, and wherein the upper cylinder portion is surrounded by the receiving molding along at least a majority of a length of the upper cylinder portion,
the inner bush comprises a collar at an upper end region that extends outward from the ball-joint pin, and
the collar of the inner bush contacts a top nut that is screwed into a top end of the cylindrical shaft portion of the ball-joint pin.

12. The wheel support or pivot bearing according to claim 11,
wherein the collar of the inner bush extends outward from the ball-join pin perpendicularly to an axis of the ball-joint pin.

13. The wheel support or pivot bearing according to claim 11,
wherein the collar of the inner bush extends outward from the ball-join pin at least as far as an outer surface of the outer bush that faces away from the ball-joint pin.

14. The wheel support or pivot bearing according to claim 11,
wherein the elastomer layer comprises a collar at an upper end region that extends outward from the ball-joint pin with a profile that matches a profile of the collar of the inner bush, and which is located at least partially between the collar of the inner bush and an upper end of the outer bush.

* * * * *